United States Patent
Antonioli et al.

(10) Patent No.: US 12,219,627 B2
(45) Date of Patent: Feb. 4, 2025

(54) CONTROL INFORMATION EXCHANGE FOR CONTROL OF D2D COMMUNICATION

(71) Applicant: Telefonaktiebolaget LM Ericsson (publ), Stockholm (SE)

(72) Inventors: Roberto Antonioli, Fortaleza (BR); Gabor Fodor, Hässelby (SE); Pablo Soldati, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 392 days.

(21) Appl. No.: 17/640,399

(22) PCT Filed: Sep. 14, 2020

(86) PCT No.: PCT/EP2020/075631
§ 371 (c)(1),
(2) Date: Mar. 4, 2022

(87) PCT Pub. No.: WO2021/052904
PCT Pub. Date: Mar. 25, 2021

(65) Prior Publication Data
US 2022/0377821 A1  Nov. 24, 2022

Related U.S. Application Data

(60) Provisional application No. 62/900,896, filed on Sep. 16, 2019.

(51) Int. Cl.
*H04L 12/00* (2006.01)
*H04W 28/24* (2009.01)
*H04W 76/14* (2018.01)
*H04W 88/04* (2009.01)

(52) U.S. Cl.
CPC ........... *H04W 76/14* (2018.02); *H04W 28/24* (2013.01); *H04W 88/04* (2013.01)

(58) Field of Classification Search
CPC ..... H04W 76/14; H04W 28/24; H04W 88/04; H04W 72/20; H04W 72/02; H04W 84/18; Y02D 30/70
USPC ......................................................... 370/329
See application file for complete search history.

(56) References Cited

U.S. PATENT DOCUMENTS

| | | | |
|---|---|---|---|
| 10,993,253 B2* | 4/2021 | Loehr | H04W 72/21 |
| 2016/0234789 A1* | 8/2016 | Oh | H04W 52/245 |
| 2018/0139605 A1* | 5/2018 | Choi | H04W 4/203 |
| 2021/0309270 A1* | 10/2021 | Haas | B61L 27/57 |

FOREIGN PATENT DOCUMENTS

| | | | | |
|---|---|---|---|---|
| WO | WO-2014179978 A1 * | 11/2014 | | H04W 52/244 |
| WO | 2018064179 A1 | 4/2018 | | |
| WO | WO-2021204368 A1 * | 10/2021 | | H04W 28/0236 |

* cited by examiner

*Primary Examiner* — Frantz Coby
(74) *Attorney, Agent, or Firm* — Weisberg I.P. Law, P.A.

(57) ABSTRACT

Control information exchange for control of D2D communication A first D2D communication device (10) receives first information from one or more second D2D communication devices (10). The first information indicates control information for one or more links from the respective second D2D communication device (10). Based on the indicated control information, the first D2D communication device (10) determines control information for one or more links from the first D2D communication device (10).

19 Claims, 11 Drawing Sheets

| PSEUDO-CODE OF PROPOSED ITERATIVE METHOD |
|---|
| 1. TX: Initialize $m_{u,s}$ meeting power constraints. |
| 2. TX: Use initial $m_{u,s}$ to transmit pilots. |
| 3. REPEAT |
| 4.     RX: Generate $w_{u,s}$ using (2). |
| 5.     Set $i = 1$. |
| 6.     REPEAT |
| 7.         RX: Measure MSE $\epsilon_{u,s}$ as shown in (3). |
| 8.         RX: Update the value of $a_{u,s}^{(i)}$ from (4). |
| 9.         RX: Compute value of $\gamma_u^{(i+1)}$ from (5). |
| 10.         RX: Compute value of $\theta_u^{(i+1)}$ from (6). |
| 11.         RX: Compute value of $d_u$ from (7). |
| 12.         RX: Assign weights $\lambda_{u,s}$ from (8). |
| 13.         RX: Send $\lambda_{u,s}$ to TX using uplink pilot. |
| 14.         TX: Exchange values of $\lambda_{u,s}$ with other TXs. |
| 15.         TX: Solve $m_{u,s}$ using (9). |
| 16.         TX: Use computed $m_{u,s}$ to transmit pilots. |
| 17.         RX: Update the value of $t_{u,s}^{(i+1)}$ from (10). |
| 18.         Set $i = i + 1$. |
| 19.     UNTIL Convergence has been reached or $i > I_{max}$. |
| 20. UNTIL Convergence has been reached. |

FIG. 9

CONTROL INFORMATION EXCHANGE FOR CONTROL OF D2D COMMUNICATION

TECHNICAL FIELD

The present invention relates to methods for controlling device-to-device (D2D) communication and to corresponding devices, nodes, systems, and computer programs.

BACKGROUND

Current wireless communication networks, e.g., based on the LTE (Long Term Evolution) or NR technology as specified by 3GPP, also support D2D communication modes to enable direct communication between UEs (user equipments). Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communications is another term used to refer to this class of communication. Vehicle communications have the potential to increase traffic safety, reduce energy consumption and enable new services related to intelligent transportation systems.

In some scenarios where vehicles and the other involved communication entities are equipped with multiple transmit and receive antennas communication may be performed over what is known as a multiple input multiple output (MIMO) interference broadcast channel (IBC). Such scenarios may also involve that multiple transmitting nodes attempt to transmit to possibly multiple intended receiving nodes on a given time-frequency resource.

User scheduling techniques may be used for access coordination when multiple communication links are competing for resources in a shared wireless medium. One of the main responsibilities of scheduling techniques is to decide which users can transmit on each time slot as well as how much bandwidth should be assigned to each scheduled user. In MIMO systems, transmitting and receiving nodes utilize multiple antennas in order to spatially multiplex data streams on a given frequency-time resource. In this case, user scheduling in such systems may aim at simultaneously accommodating multiple users with some reasonable quality of service (QoS) within the same frequency-time resource by means of spatial-division multiplexing.

In some MIMO systems, a previous centralized or distributed mechanism (e.g., a mechanism executed by the cellular infrastructure) may be used to pre-schedule the frequency-time resources on which each node should transmit or receive data. Then, a MIMO scheduling method is executed for optimizing the transceiver vectors targeting a certain objective and attempting to ensure some reasonable QoS. The computation of the transceiver vectors may be carried out in a distributed manner, i.e., each involved node performed its own computations based on some information received from other nodes. However, such optimization of link parameters may be difficult to handle in D2D communication scenarios, where multiple links coexist on the same time-frequency resources and may be subject to frequent changes due to mobility of the involved D2D communication devices, e.g., due to moving vehicles in a V2X communication scenario, where a central coordinating entity is not available. For example, it may be difficult to decide when a D2D communication device should transmit and when it should rather refrain from transmission and wait for a suitable transmission opportunity. Further, it may be difficult to decide what transmit power and precoder should be used. Further, it may be difficult to implement QoS constraints and to handle violations of such QoS constraints.

Accordingly, there is a need for techniques which allow for efficiently controlling D2D communication.

SUMMARY

According to an embodiment, a method of controlling D2D communication is provided. According to the method a first D2D communication device receives first information from one or more second D2D communication devices. The first information indicates control information for one or more links from the respective second D2D communication device. Based on the indicated control information, the first D2D communication device determines control information for one or more links from the first D2D communication device.

According to a further embodiment, a first D2D communication device is provided. The first D2D communication device is configured to receive first information from one or more second D2D communication devices. The first information indicates control information for one or more links from the respective second D2D communication device. Further, the first D2D communication device is configured to, based on the indicated control information, determine control information for one or more links from the first D2D communication device.

According to a further embodiment, a first D2D communication device is provided. The first D2D communication device comprises at least one processor and a memory. The memory contains instructions executable by said at least one processor, whereby the first D2D communication device is operative to receive first information from one or more second D2D communication devices. The first information indicates control information for one or more links from the respective second D2D communication device. Further, the memory contains instructions executable by said at least one processor, whereby the first D2D communication device is operative to, based on the indicated control information, determine control information for one or more links from the first D2D communication device.

According to a further embodiment, a computer program or computer program product is provided, e.g., in the form of a non-transitory storage medium, which comprises program code to be executed by at least one processor of a first D2D communication device. Execution of the program code causes the first D2D communication device to receive first information from one or more second D2D communication devices. The first information indicates control information for one or more links from the respective second D2D communication device. Further, execution of the program code causes the first D2D communication device to, based on the indicated control information, determine control information for one or more links from the first D2D communication device.

Details of such embodiments and further embodiments will be apparent from the following detailed description of embodiments.

BRIEF DESCRIPTION OF THE DRAWINGS

FIG. 9 illustrates an example of pseudo-code for implementing control of D2D communication according to an embodiment of the invention.

DETAILED DESCRIPTION OF EMBODIMENTS

Figure 1:
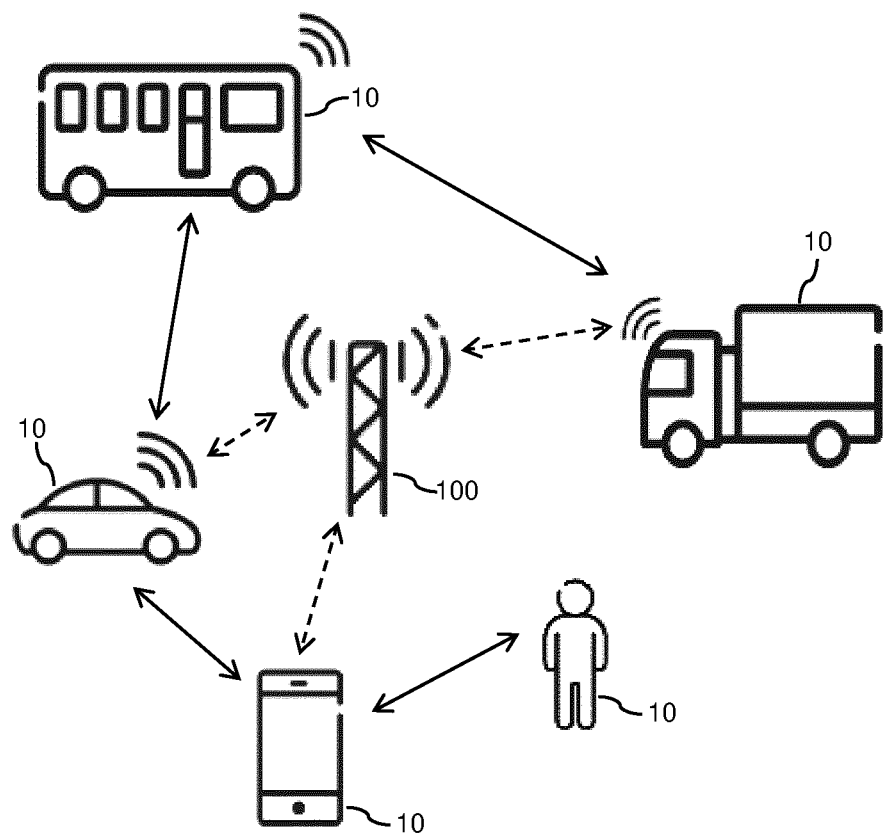
FIG. 1 schematically illustrates an exemplary V2X scenario in which D2D communication may be controlled according to an embodiment of the invention.

In the following, concepts in accordance with exemplary embodiments of the invention will be explained in more detail and with reference to the accompanying drawings. The illustrated embodiments relate to controlling of D2D communication between UEs. The D2D communication may for example be based on the LTE radio technology or the NR radio technology as specified by 3GPP ($3^{rd}$ Generation Partnership Project). However, it is noted that the illustrated concepts could also be applied to other technologies, e.g., a WLAN (Wireless Local Area Network) technology.

The illustrated concepts may use a joint user scheduling mechanism and a transceiver design for sum-rate maximization and QoS assurance considering MIMO devices. If a wireless communication network is available, i.e., for devices in network coverage, the illustrated mechanism can take advantage of network assistance. When devices are out of network coverage, the illustrated mechanism may provide QoS, e.g., bit-rate, guarantees if QoS requirements can be met. When the QoS requirements cannot be met due to high QoS requirements relative to available resources or in view of prevailing interference situation, the illustrated mechanism reduce the QoS requirements in a controlled manner such that they can be fulfilled with a minimum deviation from the original QoS requirements.

The illustrated concepts may rely on an iterative procedure and on a low-demanding signaling exchange. The transmitting nodes and receiving nodes may compute their respective beamforming vectors aiming at optimizing a network key performance indicator (KPI) while ensuring some predetermined, e.g. by network configuration, QoS for each link. Relevant KPIs may include a system sum-rate or network throughput, network coverage, experienced user latency, or the like.

In the following, it will be further described how multi-antenna transmitting and multi-antenna receiving nodes may compute their respective beamforming vectors, aiming at maximizing the network sum-rate subject to per link QoS requirements. Here, the illustrated concepts enable treating the scheduling, e.g., by link activation, and transmitter side and receiver side parameter setting jointly at each node, such that a system-wide objective, e.g., high communication throughput and sum-rate, can be achieved while maintaining per-user QoS constraints.

As part of the illustrated concepts, per-link QoS-relaxation variables may be used for QoS-violation detection and control in order to ensure minimum QoS demands when possible, while relaxing the initial QoS demands if it is not feasible to meet the desired QoS requirements.

Procedures executed by the transmitting node and the receiving node may be summarized as follows:

A transmitting node, communicating with a receiving node via a communication link, that
computes the value of a first set of control parameters associated to the communication link with the receiving node, such parameters may include the transmit beamforming vector for each of the data streams of its intended receiving nodes;
transmits a signal to the receiving node comprising the first set of control parameters via downlink signaling/control channels or a pilot signal; and
transmits data to the receiving node according to the first set of control parameters.

A receiving node, where the receiving node can be a UE or a network node, communicating with a transmitting node via a communication link, that
receives a signal from the transmitting node comprising the first set of control parameters via downlink signaling/control channels or a pilot signal;
computes the values of a second set of control parameters associated to the communication link with the transmitting node based at least the signal received from the transmitting node;
transmits the second set of control parameters to the transmitting node, e.g., via uplink pilot or signaling/control channels; and
receives data packets from the transmitting node according to the second set of control parameters (or the signal received from the transmitting node).

FIG. 1 illustrates an exemplary scenario involving V2X communications. In particular, FIG. 1 shows various UEs 10, which may engage in V2X communication, illustrated by solid arrows. Further, FIG. 1 shows an access node 100 of a wireless communication network, e.g., an eNB of the LTE technology or a gNB of the NR technology, or an access point of a WLAN (Wireless Local Area Network). At least some of the UEs 10 may also be capable of communicating by using DL radio transmissions and/or UL radio transmissions, illustrated by broken arrows.

The UEs illustrated in FIG. 1 comprise vehicles, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 1 are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, helicopter, drone, in a spacecraft, in a train or car of a train, in a ship, in a motorcycles, in a bicycle, in a mobility scooter, or in any other kind of mobility or transportation device.

The involved communication entities, i.e., the UEs 10, may be equipped with multiple transmit and receive antennas in order to enable the special multiplexing of data streams on a given frequency-time resource.

Figure 2:
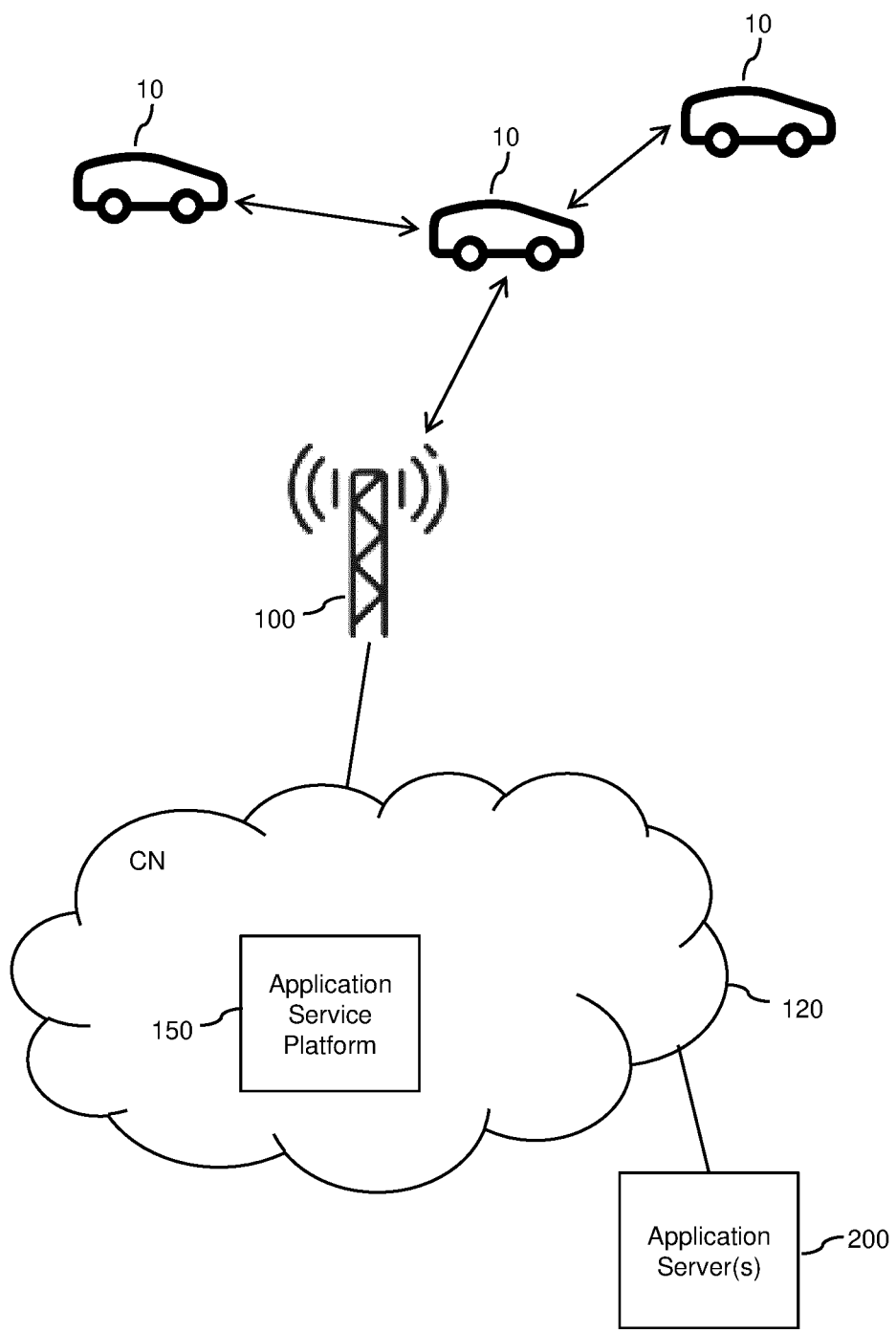
FIG. 2 schematically illustrates an exemplary scenario according to an embodiment of the invention, in which D2D communication may be controlled according to an embodiment of the invention.

FIG. 2 illustrates an exemplary D2D communication scenario. In particular, FIG. 2 shows multiple UEs 10, which are connected to each other by radio links (illustrated by double-headed arrows). Further, one of the UEs 10 is connected by a radio link to an access node 110 of a wireless communication network 120, e.g., to an eNB of the LTE technology, or a gNB of the NR technology.

The radio links may be used for D2D communication between the UEs 10. Further, the radio link to the wireless communication network 120 may be used for controlling or otherwise assisting the D2D communication. Further, the D2D communication and/or data communication with the wireless communication network 120 may be used for providing various kinds of services to the UEs 10, e.g., a voice service, a multimedia service, a data service, and/or an intelligent transportation system (ITS) or similar vehicular management or coordination service. Such services may be based on applications which are executed on the UE 10 and/or on a device linked to the UE 10. Further, FIG. 2 illustrates an application service platform 150 in the wireless communication network 120. Further, FIG. 2 illustrates one or more application servers 200 provided outside the wireless communication network. The application(s) executed on the UE 10 and/or on one or more other devices linked to the UE 10 may use the radio links with one or more other UEs 10, the application service platform 150, and/or the application server(s) 200, thereby enabling the corresponding service(s) on the UE 10.

In the example of FIG. 2, the UEs 10 are assumed to be vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit.

Figure 3A:
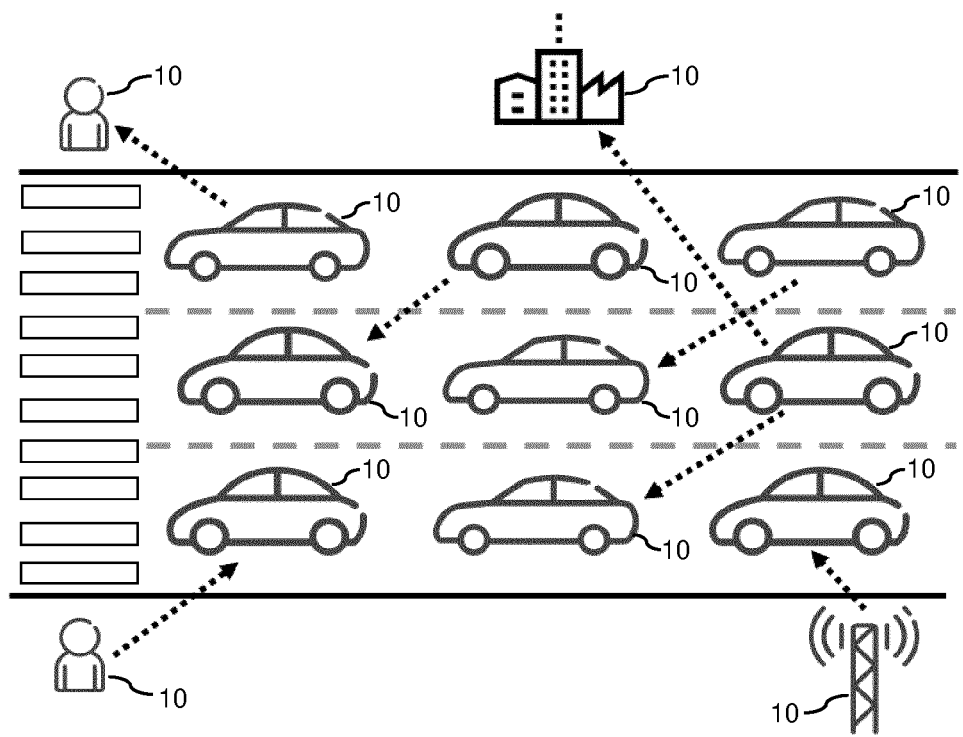
FIGS. 3A and 3B schematically illustrate further exemplary V2X scenario in which D2D communication may be controlled according to an embodiment of the invention.
Figure 3B:
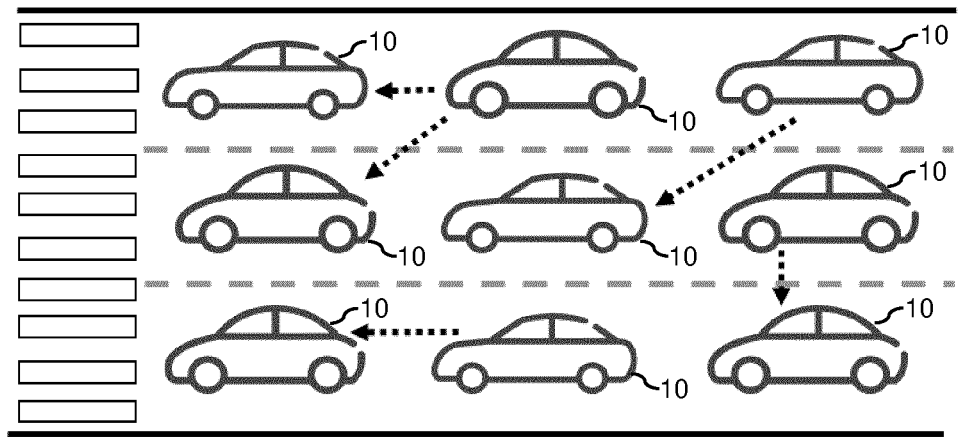

The illustrated concepts may for example be applied in vehicle communication scenarios in which vehicles, roadside communication infrastructure, a cellular network, and/or any other communication entities compete to transmit over a given frequency-time resource. An example of such a scenario is illustrated in FIG. 3A. The illustrated concepts may also be applied in a scenario where only vehicles are attempting to transmit, such as illustrated in FIG. 3B. In FIGS. 3A and 3B, arrows indicate which nodes are transmitting data and which nodes are receiving data. As illustrated in the example of FIG. 3B, a transmitting node might also have more than one intended receiving node.

In the following, the control of D2D communication according to the illustrated concepts will be explained in more detail by referring to specific examples illustrated in FIGS. 4 to 9.

As mentioned above, the illustrated concepts are applicable in infrastructure-based (i.e. cellular network assisted, in-coverage) and infrastructure-less or outside the coverage (OoC) of a network scenarios. In the OoC case, according to the invention, the UE may be preconfigured, either when it is inside the network coverage, e.g., prior to moving out of coverage, or using manual preconfiguration, for a communication link.

In the following, the term communication link is used to refer to the communication of data packets between a transmitting node (which has data packets awaiting to be transmitted) and a receiving node (which awaits to receive data packets) on a given set of frequency-time resources. As such, example of communication links are radio bearers of the 3GPP LTE or NR systems. The communication link can be either between UEs in the communication network, such as mobile terminals, handsets, vehicles, etc., or between UE and network equipment, such as radio base stations or other access nodes. Therefore, both the transmitting node and the receiving node can be any type of node, such as mobile devices, vehicles, cellular base stations or road-side infrastructure.

The illustrated concepts may consider multiple communication links, i.e., multiple pairs of transmitting node and receiving node, competing for transmission of data on a certain set of frequency-time resources. A maximum transmit power budget is associated with each transmitting node (e.g. done by the network or by manual preconfiguration in a vehicle or user device) and is denoted by $P_b$, which is a value known at each transmitting node.

In one embodiment of the method, each communication link between a transmitting node and receiving node has an associated minimum non-negative data rate requirement, indicated by $R_u \in \mathbb{R}$. The minimum data rate requirement for a communication link may be pre-configured by the network while the corresponding pair of transmitting node and receiving node is in network coverage, or it may be preconfigured in the device, by way of example associated with an application installed in the device.

Each communication link between a transmitting node and a receiving node may have associated a non-negative priority weight $\beta_u \in \mathbb{R}_+$ and/or a non-negative penalty weight $\Theta_u \in \mathbb{R}_+$. In the illustrated concepts, the values of the priority weights may be used for prioritizing communication links with higher priority weight values, i.e., the higher is the priority weight, the lesser the assigned rate is reduced. The values of the penalty weights may be used for identifying which communication links can have their QoS requirements reduced first, i.e., communication links with higher values of the penalty weight can have their QoS requirements reduced first as compared to the other communication links. The values of the priority and/or penalty weights are either determined by the a centralized control entity in the network, such as a orchestration and management (OAM) node, and then communicated to the transmitting and receiving nodes of the link, or are determined by the transmitting/receiving nodes prior to performing the illustrated method. As an alternative, the values of the priority and/or penalty weights can be application dependent and pre-configured at the transmitting node and receiving node of a communication link.

A previous centralized or distributed mechanism, e.g., a mechanism executed by wireless communication network infrastructure, such as the above-mentioned access node 110, has pre-scheduled time-frequency resources. Further, a channel estimation process may have been performed, where, for example, the transmitting/receiving nodes transmit reference signals to the receiving/transmitting nodes in a period or non-periodic manner, when transmitting data or when requested by the receiving or transmitting node. A number of data streams to be used on each communication link may have been previously defined. The illustrated method can then be employed for computing the beamforming vectors for the group of transmitting/receiving nodes selected to transmit/receive data on the time-frequency resource. This illustrated method may also allow for deciding that a potential transmitting node does not send data at a particular time instant.

Figure 4:
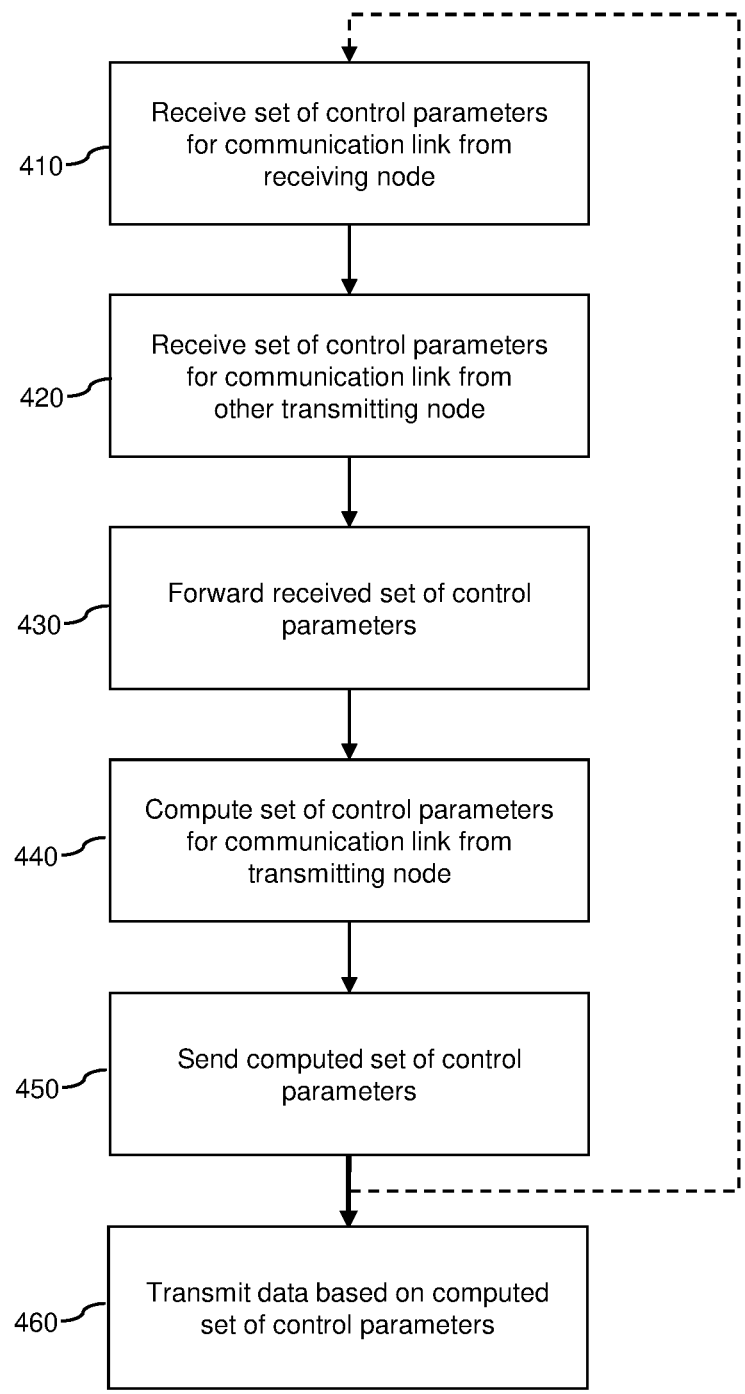
FIG. 4 shows a flowchart for schematically illustrating a method performed by a transmitting node operating according to an embodiment of the invention.

FIG. 4 shows a flowchart for illustrating a method to implement the illustrated concepts at a transmitting node. The transmitting node may correspond to any of the above-mentioned UEs 10.

On the transmitting node side the method involves computation of a first set of control parameters, in particular including a transmit power and precoder, that is to be used for transmitting the data, e.g., data packets, waiting for transmission. Using these parameters, the method may maximize a system sum-rate while meeting a minimum rate requirement when possible. Otherwise, the method may find a minimum possible QoS violation for each communication link while still maximizing the system sum-rate.

At step 410, the transmitting node may receive a second set of control parameters from the receiving node. The receiving node may provide the second set of control parameters in accordance with a method as described below in connection with FIG. 5.

At step 420, the transmitting node may receive a third set of control parameters from one or more other transmitting nodes. The other transmitting node(s) may provide the third set of control parameters in accordance with a method as described below in connection with FIG. 4.

At step 430, may forward at least a part of the set of control parameters received at step 510 and/or at step 520 to another transmitting node or to another receiving node.

At step 440, the transmitting node computes the first set of control parameters for the communication link. In this computation, the transmitting node may consider the second set of control parameters received at step 410 and/or the third set of control parameters received at step 420. Accordingly, upon receiving the control parameters from other transmitting nodes, the transmitting node may update the values of one or more control parameters computed for the communication link from the transmitting node to the receiving node. For example, the third set of control parameters may include one or more weights associated to one or more data streams of a communication link from the other transmitting node, which are then used by the transmitting node to compute one or more transmit beamforming vector associated to one or more data streams of the communication link from the transmitting node to the receiving node.

The first set of control parameters associated to the communication link with the receiving node may include one or more of:
one or more transmit beamforming vector associated to one or more data streams of the communication link;
one or more scalar parameters for controlling the power allocation of the transmit beamforming vectors;
a control flag for closed loop control.
a control parameter T≥1 indicating the number of times the receiving node shall perform closed-loop optimization of control parameters with the transmitting node, which comprises repeating one or more steps required to calculate control parameters associated to the communication link between the transmitting and receiving node;
a control flag for data reception.

The control flag for closed loop control may be set to "FALSE" or to "TRUE". The transmitting node may set the control flag for closed loop control to TRUE in order to configure the receiving node to perform closed loop optimization of control parameters associated to the communication link with the transmitting node for a number of T≥1 times.

In one possible implementation, for instance, the first set of control parameters may include only one or more transmit beamforming vector associated to one or more data streams of the communication link and one or more scalar parameters for controlling the power allocation of the transmit beamforming vectors.

The control flag for data reception may be set to "FALSE" or to "TRUE". The transmitter node shall set the control flag for data reception to TRUE in order to configure the receiving node to receive a data transmission after one or more iterations of closed loop optimization of control parameters for the communication link.

At step 450, the transmitting node may further send a fourth set of control parameters associated to the communication link with the receiving node to one or more other transmitting nodes, e.g., by broadcasting the fourth set of control parameters. The fourth set of control parameters may include one or more control parameters belonging to the first set of control parameters, i.e. the fourth set of control parameters may be a subset of or equal to the first set of control parameters. In one implementation of the invention, the transmitting node transmits the fourth set of control parameters to other transmitting nodes whose communication links may use the same set of time-frequency resources as the communication link with the receiving node. The one or more transmitting nodes in a surrounding region of the transmitting node may then receive and decode the fourth set of control parameters and utilize this information in computation of control parameters for their communication links.

As illustrated by a broken arrow in FIG. 4, the transmitting nodes may iterate the steps of receiving information, sending information and computing the control parameters multiple times prior to transmitting data to the receiving node at step 460. Therefore, in one case, before transmitting data to the receiving node over the communication link, the transmitting node repeats multiple times the steps of:
receiving the second set of control parameters from the receiving node of the communication link (step 410) and/or receiving the third set of control parameters associated to another communication link (step 420);
forwarding the received set(s) of control parameters (step 430);
computing the first set of control parameters for the communication link with the receiving node (step 440);
sending the first set of control parameters to other nodes (step 450).

Figure 5:
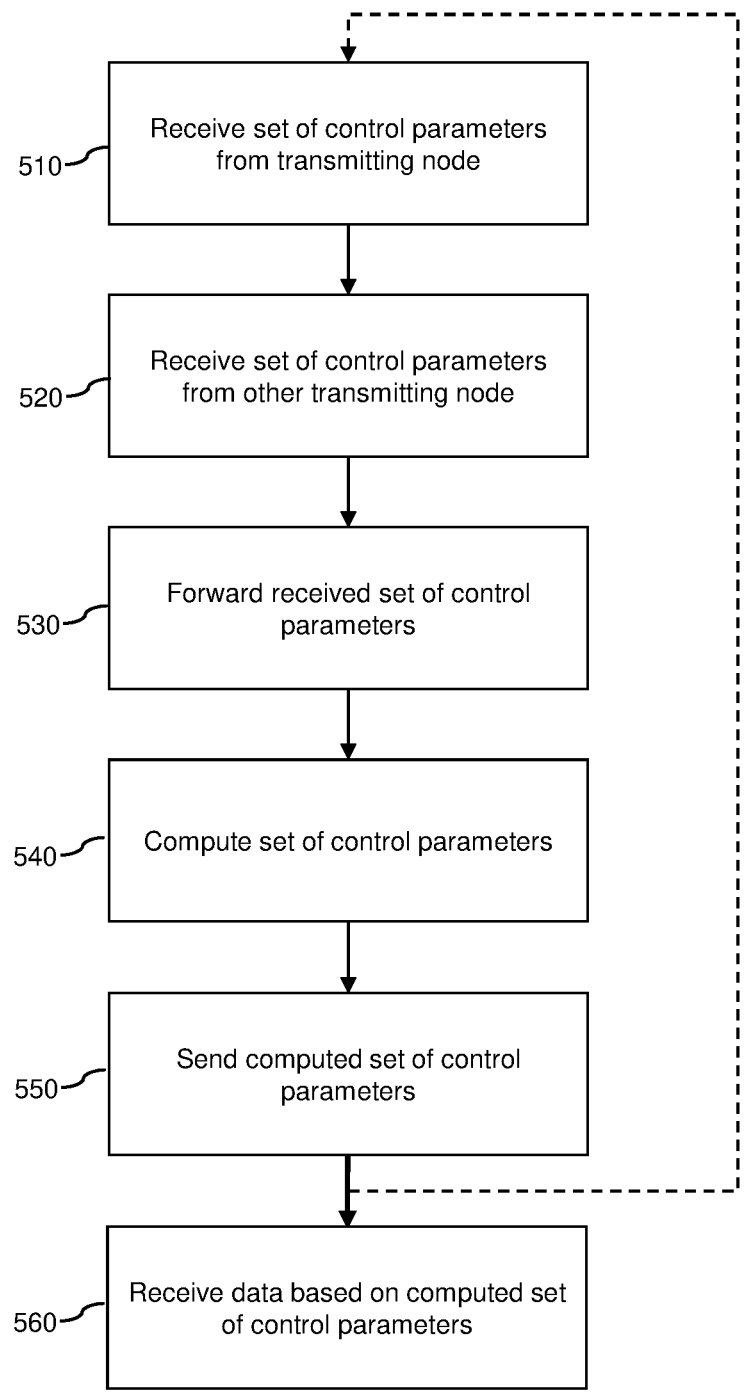
FIG. 5 shows a flowchart for schematically illustrating a method performed by a receiving node operating according to an embodiment of the invention.

FIG. 5 shows a flowchart for illustrating a method to implement the illustrated concepts at a receiving node. The receiving node may correspond to any of the above-mentioned UEs 10.

On the receiving node side the method involves the computation of a decoder and a second set of control parameters in order to properly receive the data and to detect and control QoS violations.

At step 510 the receiving node receives a signal from the transmitting node. The signal can be a pilot signal or some other signal, e.g., a control channel. The signal indicates the first set of control parameters.

At step 520 the receiving node may receive a signal from another transmitting node and/or another receiving node. The signal can be a pilot signal or some other signal, e.g., a control channel. The signal indicates a further set of control parameters.

At step 530, the receiving node may forward at least a part of the set of control parameters received at step 510 and/or at step 520 to another receiving node or to another transmitting node.

At step 540, the receiving node computes the values of a second set of control parameters associated to the communication link with the transmitting node based on at least the signal received from the transmitting node.

At step 550. the receiving node then sends the second set of control parameters to the transmitting node, e.g., a pilot signal, a control channel, or some other signal.

At step 560, the receiving node uses one or more parameters in the second set of control parameters to receive and decode the information received from the transmitting node. For example, the receiving node may receive and decode a data transmission from the transmitting node based on one or more beamforming vectors computed at step 540.

The first set of control parameters may include a control flag for closed loop control. For example, the control flag may be set to "FALSE" or "TRUE". In the latter case, as illustrated by a broken arrow in FIG. 5, before receiving a data packet, the receiving node may iterate multiple times the steps of:

receiving a signal from the transmitting node comprising the first set of control parameters via downlink signaling/control channels or a pilot signal;

computing the values of a second set of control parameters associated to the communication link with the transmitting node based at least the signal received from the transmitting node;

transmitting the second set of control parameters to the transmitting node (e.g., via uplink pilot or signaling/control channels).

After $T \geq 1$ iterations, the receiving node may use one or more parameters from the first or second set of control parameters to receive and decode the information received from the transmitting node. In one embodiment, the number of iterations $T \geq 1$ is signaled by the transmitting node as part of the first set of control parameters. In another embodiment, the value $T \geq 1$ of iterations is preconfigured for the receiving node.

The first set of control parameters may include a control flag for data reception. When the control flag for data reception is set to TRUE, the receiving node is configured to receive data from the transmitting node according to the first or second set of control parameters. This flag indicates to the receiving node that after the current iteration of closed-loop control optimization of the control parameters associated to the communication link, the receiving node shall receive data transmission from the transmitting node.

The receiving nodes may compute the second set of control parameters associated to the communication link by estimating the current communication link reliability and quality, characterized by, for example, the received bit error rate and/or symbol error probability (expressed in terms of, for example mean squared error, MSE) and/or characterizing the communication link's longer-term statistics, such as the covariance matrix of the communication channel measurable/estimated at the receiving node's side;

computing the values of the second set of control parameters associated to the communication link with the transmitting node based the current communication link reliability and quality.

In one example, the receiving node estimates the quality of the communication channel and the quality of the current communication parameters, measuring and estimating the symbol error, in terms of, for example, the mean squared error (MSE) of the received data symbols. For example, the estimation of the MSE might be performed using closed-form equations or from measuring errors from pilot symbols or data symbols that are detected erroneous over a given time window. In step 3, the receiving node computes receive beamforming vectors for each of its data streams. The computation of such receive beamforming vectors is possible by acquiring channel state information at the receiver (CSIR) and employing multiuser receivers, such as minimum mean square error (MMSE) or interference rejection combining (IRC) receivers, successive interference cancellation (SIC) receivers and/or combinations of these type of receiver structures (which are known to the skilled person).

The second set of control parameters associated to the communication link with the transmitting node may include one or more of:

one or more receive beamforming vectors associated to one or more data stream of the communication link;

one or more QoS-relaxation variables associated to the communication link;

one or more weights associated to one or more data streams of the communication link, which are used by the transmitting node to properly distributed the transmission power among the one or more data streams of the communication link;

one or more scalar values used for an approximation of the current estimation of the current communication link reliability and quality;

one or more scalar values for controlling the rate violation with respect to the rate requirements; and/or one or more scalar values for controlling the violation of the QoS-relaxation variables associated to the communication link.

In one possible implementation of the method, for instance, the second set of control parameters may comprise one or more receive beamforming vector associated to one or more data stream of the communication link. This information is used by the transmitting node to adapt the corresponding transmit beamforming vectors for optimizing the data transmission over the communication link.

In another possible implementation of the method, the second set of control parameters may comprise one or more receive beamforming vector associated to one or more data stream of the communication link and one or more QoS-relaxation variables associated to the communication link. This information is used by the transmitting node to adapt the corresponding transmit beamforming vectors for optimizing the data transmission over the communication link taking into account the QoS requirement of the communication link.

In another possible implementation of the method, the second set of control parameters may comprise one or more receive beamforming vector associated to one or more data stream of the communication link and one or more weights associated to one or more data streams of the communication link. This information is used by the transmitting node to adapt the corresponding transmit beamforming vectors for optimizing the data transmission over the communication link taking into account the weights associated to one or more data streams of the communication link.

Figure 6:
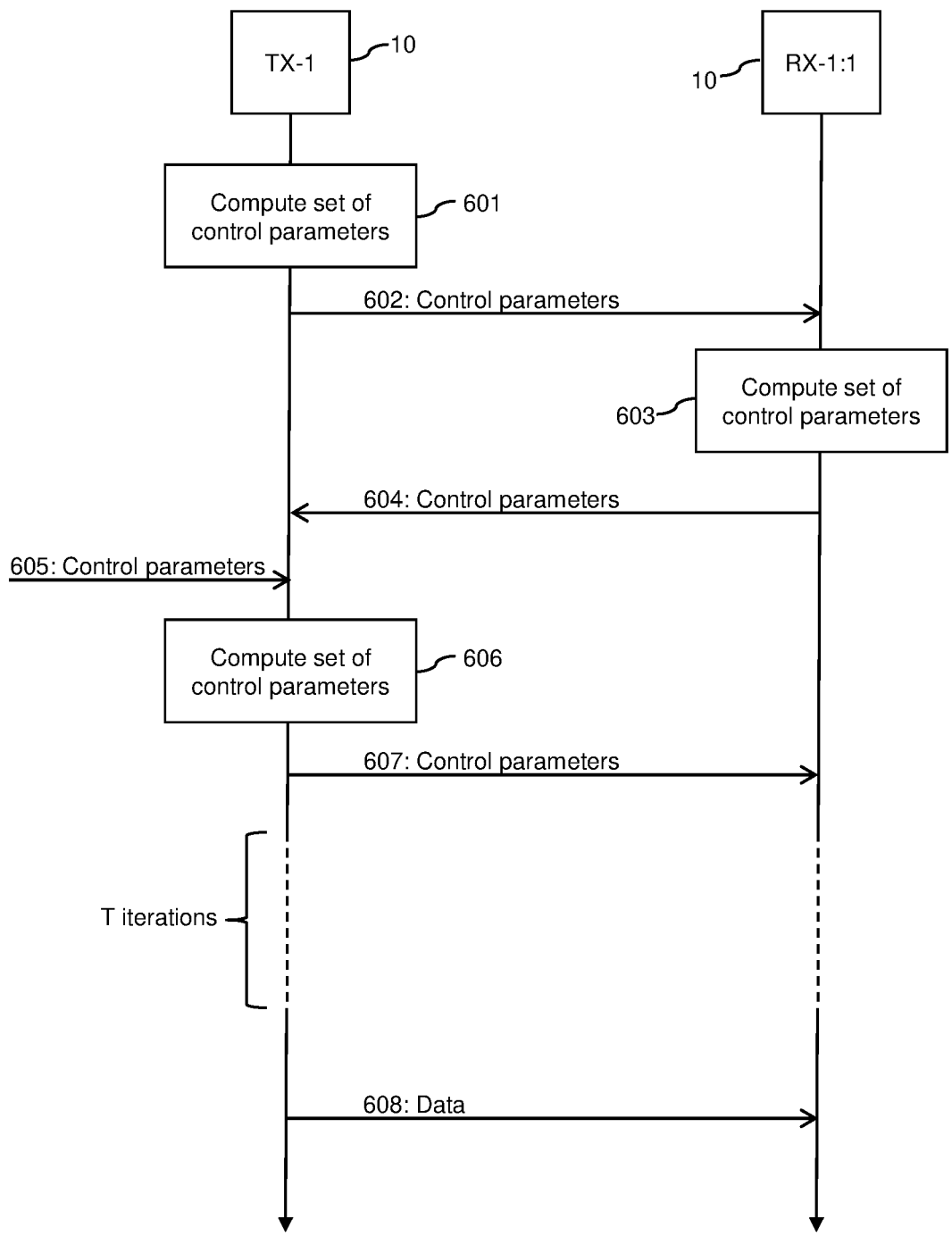
FIG. 6 schematically illustrates an example of processes involving control of D2D communication according to an embodiment of the invention.

FIG. 6 an example of processes based on the method of FIGS. 4 and 5. Specifically, FIG. 6 illustrates signaling between a transmitting node (TX-1) and a receiving node (RX-1:1) of a communication link (link 1). FIG. 6 also shows further details concerning the steps from FIG. 4 and FIG. 5 which are executed by the transmitting node and receiving node. In FIG. 6, the transmitting node and the receiving node may correspond to any pair of the above-mentioned UEs 10.

At block 601, the transmitting node initially computes the first set of control parameters. The transmitting node then sends a signal 602 to the receiving node. The signal 602 indicates at least a part of the computed first set of parameters. The signal 602 may be a pilot signal, a control channel signal, or some other type of signal.

The receiving node receives the signal and uses the indicated part of the first set of control parameters as a basis for computing the second set of control parameters, as indicated by block 603. The receiving node then sends a signal 604 to the transmitting node. The signal 604 indicates at least a part of the computed second set of parameters. The signal 604 may be a pilot signal, a control channel signal, or some other type of signal.

The transmitting node further receives a signal 605, e.g., from another transmitting node. The signal 605 indicates a third set of control parameters. The transmitting node then uses the control parameters indicated by the signals 604, 605 to re-compute the first set of control parameters, as indicated by block 606. The transmitting node then sends a signal 607 to the receiving node. The signal 607 indicates at least a part of the re-computed first set of parameters. The signal 602 may be a pilot signal, a control channel signal, or some other type of signal.

As further illustrated, the computation of parameters at blocks 603 and 605 and the exchange of information by signals 604, 605, and 607 may then be iterated for T times, until the transmitting node used the final re-computed set first set of control parameters to send data 608.

Figure 7:
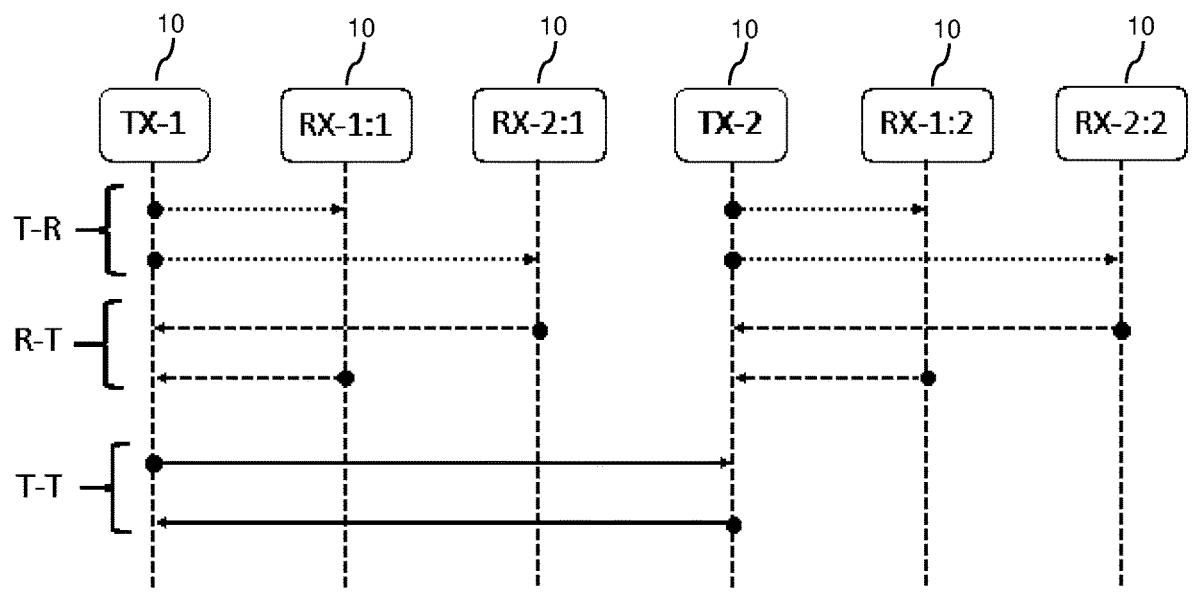
FIG. 7 schematically illustrates a further example of processes involving control of D2D communication according to an embodiment of the invention.
Figure 8:
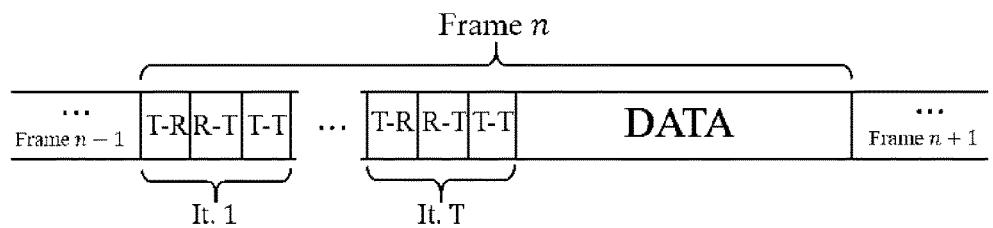
FIG. 8 schematically illustrates an example of a frame structure which may be utilized for D2D communication according to an embodiment of the invention.

FIG. 8 illustrates the signalling exchange which is similar to that of FIG. 6 but involves two transmitting nodes (TX-1 and TX-2), with each transmitting node having two intended receiving nodes. In FIG. 8 RX-1:1 denotes a first receiving node of TX-1 and RX-2:1 denotes a second receiving node of TX-1, while RX-1:2 denotes a first the receiving node of TX-2 and RX-2:2 denotes a second receiving node of TX-2. In FIG. 7 dotted arrows illustrate the information signalled from the transmitting node to the receiving node (similar to signals 602 and 607 of FIG. 6). This phase of signalling is denoted by T-R (transmitter-receiver). Broken arrows illustrate the information signalled from the receiving node to the transmitting node (similar to signal 604 of FIG. 6). This phase of signalling is denoted by R-T (receiver-transmitter). Solid arrows illustrate the information signalled from transmitting node to transmitting node (similar to signal 605 of FIG. 6). This phase of signalling is denoted by T-T (transmitter-transmitter).

FIG. 9 illustrates an example of a frame structure which may be used to support the illustrated method. As can be seen, the frame structure is divided into two main parts: a first part used for the beamforming setup, and a second part is used for the actual data transmission. In the beamforming setup phase, the signaling is split into three parts: 1) 'T-R', which denotes the forward signalling, which occurs from the transmitting nodes to the receiving nodes and includes at least the first set of control parameters; 2) 'R-T', which denotes the backward signalling, which happens from each receiving node to its associated transmitting node and includes at least the second set of control parameters; and 3) 'T-T', which denotes the signaling exchange between transmitting nodes and includes at least the third set of control parameters.

FIG. 9 illustrates an example of pseudocode of an iterative method based on the illustrated concepts. In the following, computation of parameters in the illustrated example will be described in more detail.

The illustrated example assumes a scenario composed of B transmitters equipped with $N_T$ antennas and U receivers equipped with $N_R$ antennas. It is worth noting that there is no assumption about the nature of the devices acting as transmitters and receivers. They can be cellular base stations, cellular devices, vehicles, road-side infrastructure, among others. Therefore, the method described can be used in scenarios where only vehicles are involved as well as in scenarios where there are cellular devices, BSs and vehicles, for example. The scenario considered herein is also known as the multiple-input multiple-output interference broadcast channel (MIMO IBC). Each transmitting node b serves a set of receiving nodes denoted by $U_b$ with $U_b = |U_b|$. Each receiving node u is served by a single transmitting node $b_u$. The number of spatial streams scheduled per user is fixed and computed prior to the executing of the proposed method, where the number of data streams allocated to receiving node u is $S_u$. The s-th stream of receiving node u is denoted by (u,s).

In the illustrated example of the iterative method, the following parameters are considered: $H_{b_i,u} \in \mathbb{R}^{N_R \times N_T}$ denotes a channel matrix between transmitting node u and receiving node b serving the receiving node i. The channel matrix $H_{b_i,u}$ or an estimate of the channel matrix $H_{b_i,u}$ is maintained by each transmitting node with respect to its receiving node(s) and by each receiving node with respect to its transmitting node(s). The channel matrix $H_{b_i,u}$ may be acquired by estimation by the receiving node or the transmitting node using known and/or standardized methods, such as estimation based on a reference signal (RS).

$m_{u,s} \in \mathbb{R}^{N_T}$ denotes a transmit beamforming vector. Such transmit beamforming vector may be available at each transmitting node per data stream of each intended receiving node. The transmit beamforming vector $m_{u,s}$ may be computed by the transmitting node using the illustrated iterative method, based on information collected from the receiving node(s) and/or one or more other transmitting node(s). The transmit beamforming vector $m_{u,s}$ may then be used for transmitting data and/or pilot signals. The data and/or pilot signals may include parameters computed by the transmitting node.

$w_{u,s} \in \mathbb{R}^{N_R}$ denotes a receive beamforming vector. Such receive beamforming vector may be available at each receiving node per each of its received data streams. The receive beamforming vector $w_{u,s}$ may be computed by the receiving node using the illustrated iterative method, based on information collected from the transmitting node(s) and/or one or more other receiving node(s). The receive beamforming vector $w_{u,s}$ may then be used for receiving data and/or pilot signals. The data and/or pilot signals may include parameters computed by other nodes.

$\in_{u,s} \in \mathbb{R}$ denotes an MSE (Mean Square Error) parameter. The parameter $\in_{u,s}$ may be available at each receiving node and each transmitting node. Each receiving node may estimate the parameter $\in_{u,s}$ for its own received data streams and may indicate the parameter $\epsilon_{u,s}$ or a value corresponding to the parameter $\epsilon_{u,s}$ to the corresponding transmitting node.

$a_{u,s}^{(i)} \in \mathbb{R}$ denotes a parameter used for approximation of the current estimation of the current communication link reliability and quality at iteration (i). The parameter $a_{u,s}^{(i)}$ may be available at each receiving node. The parameter $a_{u,s}^{(i)}$ may be computed by the receiving node using the illustrated iterative method, based on information collected from the transmitting node(s) and/or one or more other receiving node(s).

$\gamma_u^{(i+1)} \in \mathbb{R}$ denotes a parameter for controlling rate violation with respect to rate requirements of the communication link, at iteration (i+1). The parameter $\gamma_u^{(i+1)}$ may be available at each receiving node. The parameter $\gamma_u^{(i+1)}$ may be computed by the receiving node using the illustrated iterative method, based on information collected from the transmitting node(s) and/or one or more other receiving node(s).

$\theta_u^{(i+1)} \in \mathbb{R}$ denotes a parameter for controlling violation of QoS-relaxation variables associated with the communication link, at iteration (i+1). The parameter $\theta_u^{(i+1)}$ may be available at each receiving node. The parameter $\theta_u^{(i+1)}$ may be computed by the receiving node using the illustrated iterative method, based on information collected from the transmitting node(s) and/or one or more other receiving node(s).

$d_u \in \mathbb{R}$ denotes a rate relaxation variable for receiving node u. The parameter $d_u$ may be available at each receiving node. The parameter $d_u$ may be computed by the receiving node using the illustrated iterative method, based on information collected from the transmitting node(s) and/or one or more other receiving node(s).

$\lambda_{u,s} \in \mathbb{R}$ denotes weights assigned to one or more data streams of the communication link. The weights $\lambda_{u,s}$ may be available at each receiving node and each transmitting node. Each receiving node may compute the weights $\lambda_{u,s}$ for its own received data streams using the illustrated iterative method, based on information collected from the transmitting node(s) and/or one or more other receiving node(s). The receiving node may then indicate the weights $\lambda_{u,s}$ to the corresponding transmitting node. In the illustrated iterative method, the weights $\lambda_{u,s}$ may also be exchanged by transmitting nodes.

$t_{u,s}^{(i+1)} \in \mathbb{R}$ denotes a parameter used for approximation of the current estimation of the current communication link reliability and quality at iteration (i+1). The parameter $t_{u,s}^{(i+1)}$ may be available at each receiving node. The parameter $t_{u,s}^{(i+1)}$ may be computed by the receiving node using the illustrated iterative method, based on information collected from the transmitting node(s) and/or one or more other receiving node(s).

$$g(t_{u,s}^{(i)}) = \mu^{t_{u,s}^{(i)}},$$

$\psi \in \mathbb{R}$ denotes a parameter used for approximation of the current estimation of the current communication link reliability and quality at iteration (i), with the parameter $\mu$ being a scalar value satisfying $\mu > 0$. These parameters may be pre-configured, e.g., based on network settings provided to each receiving node and each transmitting node.

$\delta^{(i)} \in \mathbb{R}$ denotes a step size at iteration (i). The step size $\delta^{(i)}$ may be available at each receiving node and each transmitting node. The step size $\delta^{(i)}$ may be configured before the beginning of the illustrated iterative method, e.g., by network settings or negotiation, and then updated in a decreasing manner with each iteration.

$\beta_u \in \mathbb{R}_+$, $\Theta_u \in \mathbb{R}_+$ denote priority weight and penalty weight parameters which may vary for different time-frequency resources. These parameters may be available at each receiving node and each transmitting node and may be configured before the beginning of the illustrated iterative method, e.g., by network settings or negotiation.

$R_u \in \mathbb{R}$ denotes a rate requirement parameter which may vary for different time-frequency resources. The parameter $R_u$ may be available at each receiving node and each transmitting node and may be configured before the beginning of the illustrated iterative method, e.g., by network settings or negotiation.

The SINR (Signal-to-Interference-and-Noise Ratio) for stream s of receiving node u can for example be expressed by $$\Gamma_{u,s} = \frac{|w_{u,s}^H H_{b_u,u} m_{u,s}|^2}{\sum_{i=1}^{U} \sum_{j=1,(i,j) \neq (u,s)}^{S_u} |w_{u,s}^H H_{b_u,u} m_{u,s}|^2 + \sigma_u^2 \|w_{u,s}\|^2} \quad (1)$$

where $H_{b_i,u} \in \mathbb{R}^{c_R \times N_T}$ is the channel matrix between receiving node u and transmitting node b serving the receiving node i, $m_{u,s} \in \mathbb{R}^{N_T}$ is the transmit beamforming vector, $w_{u,s} \in \mathbb{R}^{N_R}$ is the receive beamforming vector and $\sigma_u^2$ is the noise variance at receiving node u.

The illustrated iterative method uses QoS relaxation variables to reduce the initial minimum rate requirements of some links in cases where the considered set of links cannot have their initial rate requirements met, i.e., in cases where there is an infeasible set of links with respect to the rate and power constraints and this is interrelated with the transceiver design. Therefore, using the relaxation variables, the illustrated iterative method performs a QoS-violation control in situations where it is not possible to meet the initial minimum rate requirements.

The rate relaxation variable for receiving node u is denoted by $d_u$. The range of possible values for each $d_u$ is $0 \leq d_u \leq R_u$. In cases when it is possible to meet the rate demands for every user, $d_u$ should be equal to zero for all users. Otherwise, the values of $d_u$ should be increased to the smallest possible values to not damage the system sum-rate. A penalty function is used to control the value of the relaxation variables, which is denoted by $f(d_u)$. One suitable option of penalty function is the quadratic function $f(d_u) = d_u^2$.

For a given receiving node u and stream s, the receiver beamforming vector (which is part of the second set of control parameters) is computed, for example, using the linear MMSE (Minimum Mean Square Error) receiver beamforming vector given by:

$$w_{u,s} = \left( \sum_{i=1}^{U} \sum_{j=1}^{S_u} H_{b_i,u} m_{i,j} m_{i,j}^H H_{b_i,u}^H + \sigma_u^2 I \right)^{-1} m_{u,s} H_{b_u,u}. \quad (2)$$

One option for estimating the MSE parameter (which is part of the second set of control parameters) for receiving node u and stream s is by using the following closed-form equation:

$$\epsilon_{u,s} = \left|1 - w_{u,s}^H H_{b_u,u} m_{u,s}\right|^2 + \sum_{i=1}^{U} \sum_{j=1,(i,j)\neq(u,s)}^{S_u} \left|w_{u,s}^H H_{b_i,u} m_{i,j}\right|^2 + \sigma_u^2 \|w_{u,s}\|^2. \quad (3)$$

One example of equation used for computing the value of the parameter $a_{u,s}^{(i)}$ (which is used for an approximation of the current estimation of the current communication link reliability and quality and is part of the second set of control parameters) at iteration i is:

$$a_{u,s}^{(i)} = \psi\left[g(t_{u,s}^{(i)})\right]^{-i} = \psi \epsilon_{u,s}^{(i)},$$

where g(•) can be given by $$g(t_{u,s}^{(i)}) = \mu^{t_{u,s}^{(i)}}.$$

The parameter μ is a scalar value satisfying μ>0.

The next step of the illustrated iterative method involves the computation of the parameters $\gamma_u^{(i+1)}$ (which is used for controlling the rate violation with respect to the rate requirements and is part of the second set of control parameters) and $\theta_u^{(i+1)}$ (which is used for controlling the violation of the QoS-relaxation variables associated to the communication link and is part of the second set of control parameters), which can be computed, for example, by:

$$\gamma_u^{(i+1)} = \left(\gamma_u^{(i)} + \delta^{(i)}\left(R_u - d_u - \sum_{s=1}^{S_u}\log_2(g(t_{u,s}^{(i)}))\right)\right)^+, \quad (5)$$

$$\theta_u^{(i+1)} = \left(\gamma_u^{(i)} + \delta^{(i)}(d_u(d_u - R_u))\right)^+, \quad (6)$$

where $\delta^{(i)}$ denotes the step size of the current iteration and $(\bullet)^+$ denotes the operation max(0,•). The step size has an initial value know by each of the receiving nodes and its value is updated at each iteration of the proposed method using, for example, $\delta^{(i)}=\delta^{(i)}/\sqrt{(i)}$.

The relaxation variables $d_u$ (which are QoS-relaxation variables associated to the communication link and are part of the second set of control parameters) are computed, for instance, using:

$$d_u = \frac{\gamma_u + \theta_u R_u}{2\theta_u + 2\Theta_u}. \quad (7)$$

Then, the values of the parameters $\lambda_{u,s}$ (which are weights associated to one or more data streams of the communication link and are part of the second set of control parameters) can be computed, for example, using:

$$\lambda_{u,s} = \frac{\psi(\beta_u + \gamma_u)}{a_{u,s}^{(i)} \log(2)}. \quad (8)$$

The next step of the proposed method involves the computation of the transmit beamforming vectors (which are part of the first set of control parameters) for each receiving node u and stream s, which is given by:

$$m_{u,s}=(Q_{b_u}+Iv_{b_u})^{-1}H_{b_u,u}^H w_{u,s}\lambda_{u,s}, \quad (9)$$

where $Q_{b_u}=\sum_{i=1}^{U}\sum_{j=1}^{S_i}\lambda_{i,j}H_{b_u,u}^H w_{i,j}w_{i,j}^H H_{b_u,i}$ and $v_{b_u}$ for all b and u comprises another set of parameters (which are scalar parameters for controlling the power allocation of the transmit beamforming vectors and are part of the first set of control parameters). Let us describe now one option for computing the values of $v_{b_u}$. If the power budget is fully used when solving (9) for $v_{b_u}=0$, then the computed values of transmit beamforming vectors are kept. Otherwise, the value of $v_{b_u}$ can be found using one dimensional search techniques (e.g., bisection method) with respect to the power budget constraints. An eigenvalue decomposition of $Q_{b_u}+Iv_{b_u}$ can be used to avoid the matrix inversion in (9). Alternatively, one can consider solving the linear system $Q_{b_u}+Iv_{b_u}=H_{b_u,u}^H w_{u,s}\lambda_{u,s}$. The use of such procedures makes the computational complexity of the algorithm very low.

Finally, the last step of the proposed method requires the computation of the parameters $t_{u,s}^{(i+1)}$ (which is used for an approximation of the current estimation of the current communication link reliability and quality and is part of the second set of control parameters), which can be computed, for example, using:

$$t_{u,s}^{(i+1)} = -\log_\mu(\epsilon_{u,s}^{(i+1)}). \quad (10)$$

Figure 10:
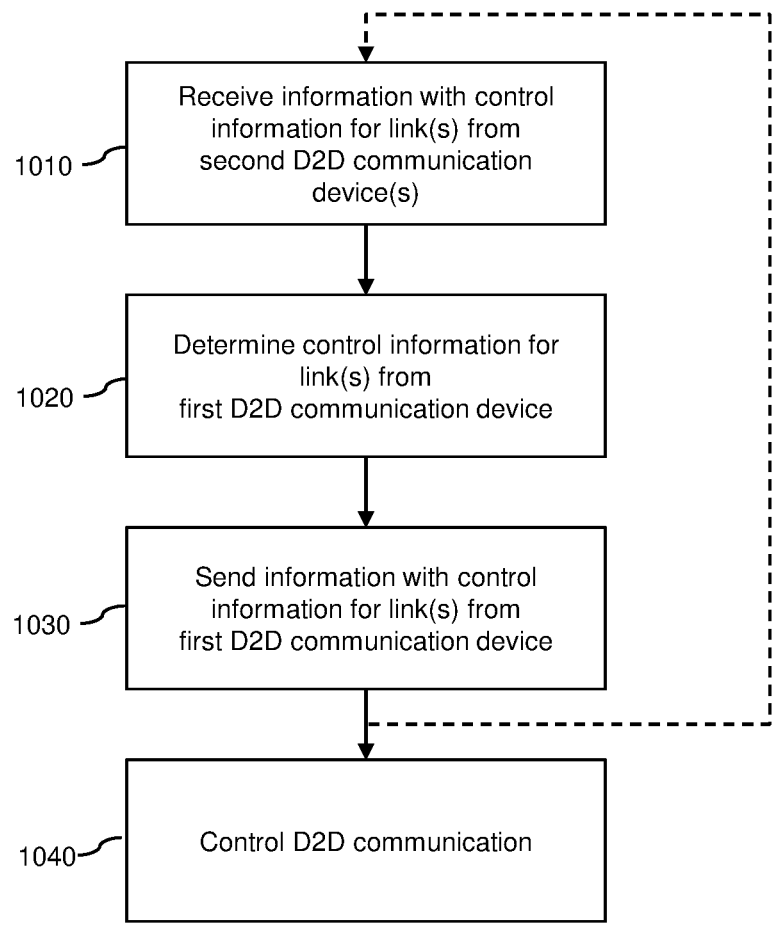
FIG. 10 shows a flowchart for illustrating a method according to an embodiment of the invention.

FIG. 10 shows a flowchart for illustrating a method, which may be utilized for implementing the illustrated concepts. The method of FIG. 10 may be used for implementing the illustrated concepts in a D2D communication device, e.g., corresponding to any of the above-mentioned UEs 10.

If a processor-based implementation of the D2D communication device is used, at least some of the steps of the method of FIG. 10 may be performed and/or controlled by one or more processors of the D2D communication device. Such D2D communication device may also include a memory storing program code for implementing at least some of the below described functionalities or steps of the method of FIG. 10.

At step 1010, the D2D communication device receives first information from one or more second D2D communication devices. The first information indicates control information for one or more links from the respective second D2D communication device.

At step 1020, the first D2D communication device determines control information for one or more links from the first D2D communication device. This is accomplished based on the indicated control information from step 1020.

At step 1020, determining the control information for one or more links from the first D2D communication device may be based on an optimization of quality and/or of reliability of the one or more links from the first D2D communication device, e.g., by using an MMSE optimization as described in connection with equation (1) to (10).

At step 1030, the first D2D communication device may send second information to one or more third D2D communication devices. The second information indicating the determined control information of step 1020 and/or the indicated control information of step 1020.

At step 1040, the D2D communication device may control D2D communication on the one or more links from the first D2D communication device. The D2D communication may involve transmitting data and/or receiving data on the one or more links.

In some scenarios, as illustrated by a broken arrow in FIG. 10, the method may be performed in an iterative manner. In this case, in response to sending the second information, the D2D communication device may receive third information from the one or more second D2D communication devices, the third information indicating updated control information for the one or more links from the respective second D2D communication device. This may correspond to a further iteration of step 1010. Based on the indicated updated control information, the first D2D communication device may then determine updated control information for the one or more links from the first D2D communication device. This may correspond to a further iteration of step 1020. In such cases, step 1040 may involve that the first D2D communication device controls communication on the one or more links from the first D2D communication device in accordance with the determined updated control information.

In some scenarios the first information may indicate whether the respective second D2D communication device intends to perform a transmission on one or more of the links from the second D2D communication device, using the indicated control information for the one or more links from the second D2D communication device, e.g., like the above-mentioned control flag for data reception.

In some scenarios the second information may further indicate whether the first D2D communication device intends to perform a transmission on one or more of the links from the first D2D communication device, using the indicated control information for the one or more of the links from the first D2D communication device, e.g., like the above-mentioned control flag for data reception.

The one or more links from the first D2D communication device may include a link from the first D2D communication device to one of the one or more second D2D communication devices. On this link, the second D2D communication device can be the transmitting node, and the first D2D communication device the receiving node, or vice versa. Further, the one or more links from the respective second D2D communication device may include a link from the respective second D2D communication device to the first D2D communication device. On this link, the second D2D communication device can be the transmitting node, and the first D2D communication device the receiving node, or vice versa. FIG. 4 illustrates an example where the D2D communication device acts as the transmitting node, while FIG. 5 illustrates an example where the D2D communication device acts the receiving node.

The control information of step 1010, 1020, or 1030 may include one or more beamforming parameters of the link, e.g., one or more beamforming vectors. Further, the control information of step 1010, 1020, or 1030 may include one or more QoS parameters of the link, e.g., one or more QoS relaxation parameters and/or one or more parameters for controlling violation of one or more other QoS parameters. Further, the control information of step 1010, 1020, or 1030 may include one or more weights for controlling distribution of transmit power to multiple data streams of the link. Further, the control information of step 1010, 1020, or 1030 may include one or more parameters for controlling violation of one or more data rate requirements of the link. Further, the control information of step 1010, 1020, or 1030 may include one or more parameters for estimation of quality of the link. Further, the control information of step 1010, 1020, or 1030 may include one or more parameters for estimation of reliability of the link.

Figure 11:
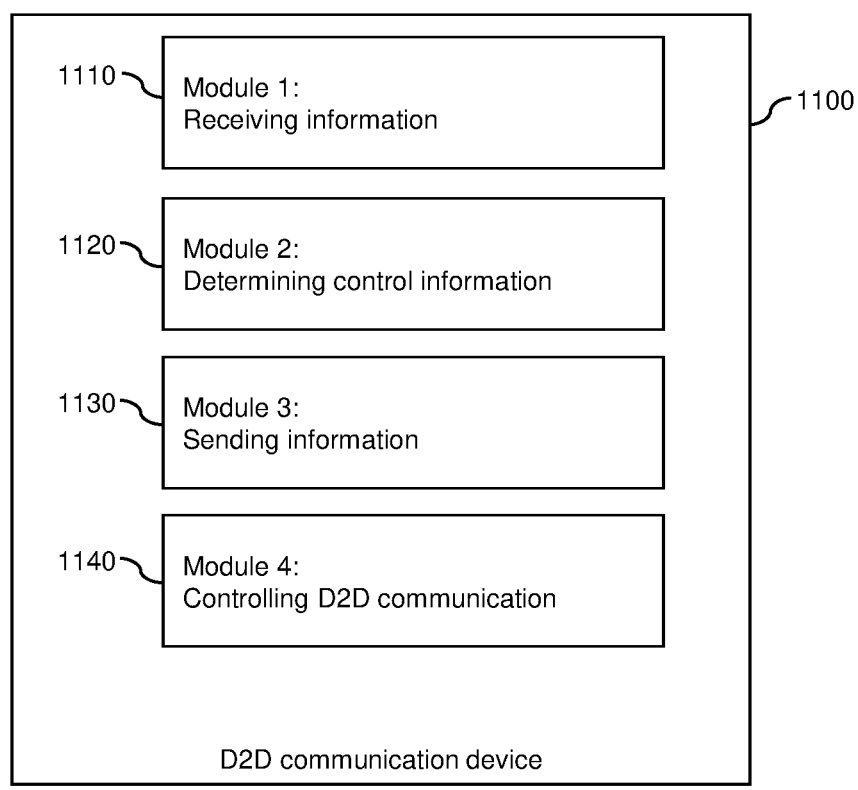
FIG. 11 shows an exemplary block diagram for illustrating functionalities of a D2D communication device implementing functionalities corresponding to the method of FIG. 10.

FIG. 11 shows a block diagram for illustrating functionalities of a D2D communication device 1100 which operates according to the method of FIG. 10. The D2D communication device 1100 may for example correspond to any of the above-mentioned UEs 10. As illustrated, the D2D communication device 1100 may be provided with a module 1110 configured to receive first information indicating control information for one or more links from second D2D communication devices, such as explained in connection with step 1010. Further, the D2D communication device 1100 may be provided with a module 1120 configured to determine control information for one or more links from the D2D communication device, such as explained in connection with step 1020. Further, the D2D communication device 1100 may be provided with a module 1130 configured to send information indicating control information for one or more links from the D2D communication device, such as explained in connection with step 1030. Further, the D2D communication device 1100 may be provided with a module 1140 configured to control D2D communication, such as explained in connection with step 1040.

It is noted that the D2D communication device 1100 may include further modules for implementing other functionalities, such as known functionalities of a UE. Further, it is noted that the modules of the D2D communication device 1100 do not necessarily represent a hardware structure of the D2D communication device 1100, but may also correspond to functional elements, e.g., implemented by hardware, software, or a combination thereof.

It is noted that the illustrated concepts could also be implemented in a system including at least multiple D2D communication devices, in particular at least one first D2D communication device operating as the first D2D communication device of the method of FIG. 10. In addition to the at least one first D2D communication device, the system may include the above-mentioned one or more second D2D communication devices and/or the above-mentioned one or more third D2D communication devices.

Figure 12:
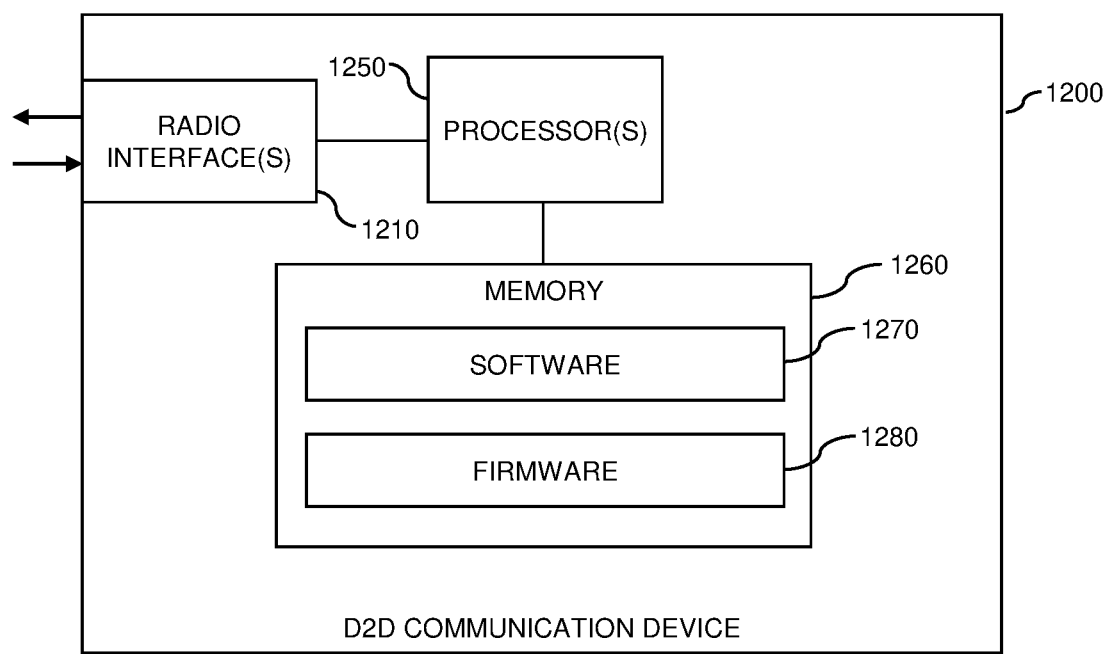
FIG. 12 schematically illustrates structures of a D2D communication device according to an embodiment of the invention.

FIG. 12 illustrates a processor-based implementation of a D2D communication device 1200 which may be used for implementing the above-described concepts. For example, the structures as illustrated in FIG. 12 may be used for implementing the concepts in any of the above-mentioned UEs 10.

As illustrated, the D2D communication device 1200 includes one or more radio interfaces 1210. The radio interface(s) 1210 may for example be based on the LTE technology or the NR technology.

Further, the D2D communication device 1200 may include one or more processors 1250 coupled to the radio interface(s) 1210 and a memory 1260 coupled to the processor(s) 1250. By way of example, the radio interface(s) 1210, the processor(s) 1250, and the memory 1260 could be coupled by one or more internal bus systems of the D2D communication device 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for controlling D2D communication, such as explained in connection with FIGS. 10 and 11.

It is to be understood that the structures as illustrated in FIG. 12 are merely schematic and that the D2D communication device 1200 may actually include further components which, for the sake of clarity, have not been illustrated, e.g., further interfaces or processors. Also, it is to be understood that the memory 1260 may include further program code for implementing known functionalities of a UE. According to some embodiments, also a computer program may be provided for implementing functionalities of the D2D communication device 1200, e.g., in the form of a physical medium storing the program code and/or other data to be stored in the memory 1260 or by making the program code available for download or by streaming.

As can be seen, the concepts as described above may be used for efficiently controlling D2D communication. Specifically, the concepts may be implemented based on per-node measurements and distributed decisions at participating nodes that guarantee the desired behavior, e.g., in terms of system-wide high throughput and per-user QoS. Further, the illustrated iterative method may offer a fast convergence of the method. The illustrated concepts may be implemented in a decentralized manner so that each involved node performs its own local computations in a completely distributed fashion upon reception of the control information associated to a communication link of another node. The illustrated concepts may be used for unicast and/or multicast transmissions, without requiring any significant modification. Further, the illustrated concepts may allow for maximizing a system sum-rate while still meeting minimum rates, e.g., corresponding to per-link QoS requirements. The illustrated concepts can additionally be used to optimize different network KPIs by means of different combinations of control parameters used to configure the communication links between network nodes. Further, the illustrated concepts may be applied in scenarios where communication links require a certain QoS, such as minimum rate requirements, as well as to the scenarios where communication links do not have QoS requirements, or a combination of such scenarios. For instance, some communication link could be required to support a minimum strictly positive communication rate (hence have a minimum data rate requirement), while other communication links could be required to support any non-negative data rate (hence have no minimum data rate requirement). The illustrated concepts may also be used to provide QoS-violation control, where the QoS requirements are met when feasible, while any occurring violation of the QoS requirements is minimized based on the optimized network KPI. This may be achieved, e.g., by deactivating links that cannot support the associated QoS requirement, thereby freeing radio resources for other communication links which are therefore enabled to meet the corresponding QoS requirement. Alternatively, the QoS requirements of one or more communication links may be reduced to optimize the network KPI while minimizing the QoS degradation for communication links that cannot meet the original QoS requirements. The illustrated concepts may enable optimizing the network KPI with limited low computational complexity and reduced signalling overhead as compared to centralized solutions.

It is to be understood that the examples and embodiments as explained above are merely illustrative and susceptible to various modifications. For example, the illustrated concepts may be applied in connection with various kinds of radio technologies, without limitation to the LTE technology or NR technology. Further, the concepts may be applied with respect to various types of UEs 10, without limitation to vehicle-based UEs. Further, the concepts may be applied with respect to various types of control parameters. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules, e.g. in a cloud system.

EMBODIMENTS

In view of the above, the present disclosure provides the following embodiments:

Embodiment 1

A method of controlling device-to-device, D2D, communication, the method comprising:
a first D2D communication device (10; 1100; 1200) receiving first information from one or more second D2D communication devices (10; 1100; 1200), the first information indicating control information for one or more links from the respective second D2D communication device (10; 1100; 1200); and
based on the indicated control information, the first D2D communication device (10; 1100; 1200) determining control information for one or more links from the first D2D communication device (10; 1100; 1200).

Embodiment 2

The method according to embodiment 1, comprising:
in accordance with the determined control information, the first D2D communication device (10; 1100; 1200) controlling communication on the one or more links from the first D2D communication device (10; 1100; 1200).

Embodiment 3

The method according to embodiment 1 or 2, comprising:
the D2D communication device (10; 1100; 1200) sending second information to one or more third D2D communication devices (10; 1100; 1200) the second information indicating the determined control information for the one or more links from the first D2D communication device (10; 1100; 1200).

Embodiment 4

The method according to any one of embodiments 1 to 3, comprising:
the D2D communication device (10; 1100; 1200) sending second information to one or more third D2D communication devices (10; 1100; 1200), the second information indicating the control information for the one or more links from the respective second D2D communication device (10; 1100; 1200).

Embodiment 5

The method according to embodiment 3 or 4,
wherein the second information indicates whether the first D2D communication device (10; 1100; 1200) intends to perform a transmission on one or more of the links from the first D2D communication device (10; 1100; 1200), using the indicated control information for the one or more of the links from the first D2D communication device (10; 1100; 1200).

Embodiment 6

The method according to any one of embodiments 3 to 5, comprising:
  in response to sending the second information, the D2D communication device (10; 1100; 1200) receiving third information from the one or more second D2D communication devices (10; 1100; 1200), the third information indicating updated control information for the one or more links from the respective second D2D communication device (10; 1100; 1200).

Embodiment 7

The method according to embodiment 6, comprising:
based on the indicated updated control information, the first D2D communication device (10; 1100; 1200) determining updated control information for the one or more links from the first D2D communication device (10; 1100; 1200).

Embodiment 8

The method according to embodiment 7, comprising:
in accordance with the determined updated control information, the first D2D communication device (10; 1100; 1200) controlling communication on the one or more links from the first D2D communication device (10; 1100; 1200).

Embodiment 9

The method according to any one of the preceding embodiments,
  wherein the first information indicates whether the respective second D2D communication device (10; 1100; 1200) intends to perform a transmission on one or more of the links from the second D2D communication device (10; 1100; 1200), using the indicated control information for the one or more links from the second D2D communication device (10; 1100; 1200).

Embodiment 10

The method according to any one of the preceding embodiments,
  wherein the one or more links from the first D2D communication device (10; 1100; 1200) comprise a link from the first D2D communication device (10; 1100; 1200) to one of the one or more second D2D communication devices (10; 1100; 1200).

Embodiment 11

The method according to any one of the preceding embodiments,
  wherein the one or more links from the respective second D2D communication device (10; 1100; 1200) comprise a link from the respective second D2D communication device (10; 1100; 1200) to the first D2D communication device (10; 1100; 1200).

Embodiment 12

The method according to any one of the preceding embodiments,
  wherein the control information comprises one or more beamforming parameters of the link.

Embodiment 13

The method according to any one of the preceding embodiments,
  wherein the control information comprises one or more quality-of-service parameters of the link.

Embodiment 14

The method according to embodiment 13,
  wherein the one or more quality-of-service parameters comprise one or more quality-of-service relaxation parameters.

Embodiment 15

The method according to embodiment 13 or 14,
  wherein the one or more quality-of-service parameters comprise one or more parameters for controlling violation of one or more other quality-of-service parameters.

Embodiment 16

The method according to any one of embodiments 1 to 15,
  wherein the control information comprises one or more weights for controlling distribution of transmit power to multiple data streams of the link.

Embodiment 17

The method according to any one of embodiments 1 to 16,
  wherein the control information comprises one or more parameters for controlling violation of one or more data rate requirements of the link.

Embodiment 18

The method according to any one of embodiments 1 to 17,
  wherein the control information comprises one or more parameters for estimation of quality of the link.

Embodiment 19

The method according to any one of embodiments 1 to 18,
  wherein the control information comprises one or more parameters for estimation of reliability of the link.

Embodiment 20

The method according to any one of embodiments 1 to 19,
  wherein said determining the control information for one or more links from the first D2D communication device (10; 1100; 1200) is based on an optimization of quality and/or of reliability of the one or more links from the first D2D communication device (10; 1100; 1200).

Embodiment 21

A first device-to-device, D2D, communication device (10; 1100; 1200), the first D2D communication device (10; 1100; 1200) being configured to:
  receive first information from one or more second D2D communication devices (10; 1100; 1200), the first information indicating control information for one or more links from the respective second D2D communication device (10; 1100; 1200); and based on the indicated control information, determine control information for one or more links from the first D2D communication device (10; 1100; 1200).

Embodiment 22

The first D2D communication device (10; 1100; 1200) according to embodiment 21,
wherein the first D2D communication device (10; 1100; 1200) is configured to perform a method according to any one of embodiments 2 to 20.

Embodiment 23

The first D2D communication device (10; 1100; 1200) according to embodiment 21 or 22, comprising:
at least one processor, and
a memory containing program code executable by the at least one processor,
whereby execution of the program code by the at least one processor causes the first D2D communication device (10; 1100; 1200) to perform a method according to any one of embodiments 1 to 20.

Embodiment 24

A computer program or computer program product comprising program code to be executed by at least one processor of a first D2D communication device (10; 1100; 1200), whereby execution of the program code causes the first D2D communication device (10; 1100; 1200) to perform a method according to any one of embodiments 1 to 20.

The invention claimed is:

1. A method of controlling device-to-device (D2D) communication, the method comprising a first D2D communication device:
receiving first information from one or more second D2D communication devices, the first information indicating control information for one or more links from the respective second D2D communication device;
determining, based on the indicated control information, control information for one or more links from the first D2D communication device; and
one of:
the control information for the one or more links from the respective second D2D communication device comprising at least one quality-of-service parameter of the one or more links from the respective second D2D communication device; and
the control information for the one or more links from the first D2D communication device comprising at least one quality-of-service parameter of the one or more links from the first D2D communication device.

2. The method of claim 1, wherein the method comprises the first D2D communication device controlling, in accordance with the determined control information, communication on the one or more links from the first D2D communication device.

3. The method of claim 1, wherein the method comprises the first D2D communication device sending second information to one or more third D2D communication devices, the second information indicating the determined control information for the one or more links from the first D2D communication device.

4. The method of claim 1, wherein the method comprises the first D2D communication device sending second information to one or more third D2D communication devices, the second information indicating the control information for the one or more links from the respective second D2D communication device.

5. The method of claim 3, wherein the second information indicates whether the first D2D communication device intends to perform a transmission on one or more of the links from the first D2D communication device, using the indicated control information for the one or more of the links from the first D2D communication device.

6. The method of claim 3, wherein the method comprises the first D2D communication device receiving, in response to sending the second information, third information from the one or more second D2D communication devices, the third information indicating updated control information for the one or more links from the respective second D2D communication device.

7. The method of claim 6, wherein the method comprises the first D2D communication device determining, based on the indicated updated control information, updated control information for the one or more links from the first D2D communication device.

8. The method of claim 7, wherein the method comprises the first D2D communication device controlling, in accordance with the determined updated control information, communication on the one or more links from the first D2D communication device.

9. The method of claim 1, wherein the first information indicates whether the respective second D2D communication device intends to perform a transmission on one or more of the links from the second D2D communication device, using the indicated control information for the one or more links from the second D2D communication device.

10. The method of claim 1, wherein the one or more links from the first D2D communication device comprise a link from the first D2D communication device to one of the one or more second D2D communication devices.

11. The method of claim 1, wherein the one or more links from the respective second D2D communication device comprise a link from the respective second D2D communication device to the first D2D communication device.

12. The method of claim 1, wherein the control information comprises one or more beamforming parameters of the link.

13. The method of claim 1, wherein the one or more quality-of-service parameters comprise at least one of:
one or more quality-of-service relaxation parameters; and
one or more parameters for controlling violation of one or more other quality-of-service parameters.

14. The method of claim 1, wherein the control information comprises one or more weights for controlling distribution of transmit power to multiple data streams of the link.

15. The method of claim 1, wherein the control information comprises one or more parameters for controlling violation of one or more data rate requirements of the link.

16. The method of claim 1, wherein the control information comprises at least one of:
one or more parameters for estimation of quality of the link; and
one or more parameters for estimation of reliability of the link.

17. The method of claim 1, wherein the determining the control information for one or more links from the first D2D communication device is based on an optimization of at least one of quality and of reliability of the one or more links from the first D2D communication device.

18. A first device-to-device (D2D) communication device, comprising:
   processing circuitry;
   memory containing instructions executable by the processing circuitry whereby the first D2D communication device is operative to:
      receive first information from one or more second D2D communication devices, the first information indicating control information for one or more links from the respective second D2D communication device; and
      determine, based on the indicated control information, control information for one or more links from the first D2D communication device; and
   one of:
      the control information for the one or more links from the respective second D2D communication device comprising at least one quality-of-service parameter of the one or more links from the respective second D2D communication device; or
      the control information for the one or more links from the first D2D communication device comprising at least one quality-of-service parameter of the one or more links from the first D2D communication device.

19. A non-transitory computer readable recording medium storing a computer program product for controlling a first device-to-device (D2D) communication device, the computer program product comprising program instructions which, when run on processing circuitry of the first D2D communication device, causes the first D2D communication device to:
   receive first information from one or more second D2D communication devices, the first information indicating control information for one or more links from the respective second D2D communication device; and
   determine, based on the indicated control information, control information for one or more links from the first D2D communication device; and
   one of:
      the control information for the one or more links from the respective second D2D communication device comprising at least one quality-of-service parameter of the one or more links from the respective second D2D communication device; or
      the control information for the one or more links from the first D2D communication device comprising at least one quality-of-service parameter of the one or more links from the first D2D communication device.

\* \* \* \* \*